United States Patent
Zhang et al.

(10) Patent No.: US 12,356,043 B2
(45) Date of Patent: Jul. 8, 2025

(54) METHOD, APPARATUS, ELECTRONIC DEVICE AND STORAGE MEDIUM FOR PLAYBACK CONTROL

(71) Applicant: Beijing Zitiao Network Technology Co., Ltd., Beijing (CN)

(72) Inventors: Wenshu Zhang, Beijing (CN); Ziwei Li, Beijing (CN); Huayun Miao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/824,805

(22) Filed: Sep. 4, 2024

(65) Prior Publication Data

US 2024/0430533 A1    Dec. 26, 2024

Related U.S. Application Data

(63) Continuation of application No. PCT/CN2023/105467, filed on Jul. 3, 2023.

(30) Foreign Application Priority Data

Jul. 7, 2022   (CN) .......................... 202210804127.3

(51) Int. Cl.
*H04N 21/472* (2011.01)
*H04N 21/2387* (2011.01)

(52) U.S. Cl.
CPC ... *H04N 21/47217* (2013.01); *H04N 21/2387* (2013.01)

(58) Field of Classification Search
CPC ........ H04N 21/47217; H04N 21/2387; H04N 21/485; H04N 21/42224; H04N 21/81;
(Continued)

(56) References Cited

U.S. PATENT DOCUMENTS 9,253,229 B1 * 2/2016 Strothmann ..... H04N 21/23439
12,143,666 B2 * 11/2024 Wang ............... H04N 21/44004
(Continued)

FOREIGN PATENT DOCUMENTS

CN    104581320 A    4/2015
CN    105843531 A    8/2016
(Continued)

OTHER PUBLICATIONS

"How to Listen to Videos at Bilibili", Available on internet at: https://ljingyan.baidu.com/article/e52e36154730ea01c70c5113.html, Jan. 3, 2022, 6 pages.
(Continued)

*Primary Examiner* — John R Schnurr
(74) *Attorney, Agent, or Firm* — Astute IP Law Group

(57) ABSTRACT

The embodiment of the invention provides a method, an apparatus, an electronic device and a storage medium for playback control. The method comprises the following steps: playing a first video in a video playback page; in response to target triggering on the video playback page, stopping displaying a video screen of the first video, and playing audio data of the first video, where the target triggering is at least one of sliding and multi-finger touching.

16 Claims, 4 Drawing Sheets

(58) Field of Classification Search
CPC ............ H04N 21/482; H04M 2250/22; H04M 1/72469; H04M 1/72454
See application file for complete search history.

(56) References Cited

U.S. PATENT DOCUMENTS

| | | | | |
|---|---|---|---|---|
| 2013/0051755 | A1* | 2/2013 | Brown | H04N 21/25875 386/E9.011 |
| 2013/0343674 | A1* | 12/2013 | Ignatchenko | G06T 3/40 382/298 |
| 2015/0002748 | A1* | 1/2015 | Kanai | H04N 21/4221 348/730 |
| 2015/0213839 | A1* | 7/2015 | Woodman | H04L 67/02 386/248 |
| 2016/0018959 | A1 | 1/2016 | Yamashita et al. | |
| 2017/0041680 | A1* | 2/2017 | Lewis | H04N 21/47202 |
| 2019/0191224 | A1* | 6/2019 | Newell | H04N 21/84 |
| 2019/0304507 | A1* | 10/2019 | Leyfman | H04N 21/436 |
| 2020/0241835 | A1* | 7/2020 | Geng | H04N 21/2387 |
| 2020/0304858 | A1* | 9/2020 | Smith | H04N 21/26241 |
| 2021/0281929 | A1* | 9/2021 | Wu | H04N 21/8456 |
| 2022/0070525 | A1* | 3/2022 | Wang | H04N 21/4436 |
| 2022/0360852 | A1* | 11/2022 | Tung | H04N 21/4782 |
| 2022/0394323 | A1* | 12/2022 | Aher | H04N 21/8133 |
| 2023/0070812 | A1* | 3/2023 | Li | G06F 16/437 |
| 2024/0121479 | A1* | 4/2024 | Chen | H04N 21/47217 |

FOREIGN PATENT DOCUMENTS

| | | |
|---|---|---|
| CN | 107360458 A | 11/2017 |
| CN | 109688460 A | 4/2019 |
| CN | 110336923 A | 10/2019 |
| CN | 111711838 A | 9/2020 |
| CN | 112347273 A | 2/2021 |
| CN | 112839255 A | 5/2021 |
| CN | 306620916 S | 6/2021 |
| CN | 115190368 A | 10/2022 |
| CN | 103024490 A | 4/2023 |
| JP | 3151652 U | 7/2009 |
| JP | 2017084387 A | 5/2017 |
| JP | 2022531738 A | 7/2022 |
| WO | 2016149928 A1 | 9/2016 |
| WO | 2019168701 A1 | 9/2019 |
| WO | 2022042001 A1 | 3/2022 |

OTHER PUBLICATIONS

"Switching to Audio Playback Mode in Youku APP, and Setting Method for Audio-only in Youku", Available on internet at: http://www.qddown.com/zixun/68741.html, Oct. 2019, 4 pages.

International Search Report and Written Opinion for PCT/CN2023/105467, mailed Sep. 20, 2023, 14 pages.

Office Action received for Chinese Patent Application No. 202210804127.3, mailed on Jun. 29, 2023, 20 pages (13 pages of English Translation and 7 pages of Original Document).

Armadyz, "Play YouTube videos in background (ROOT)", Available on internet at:<https://www.youtube.com/watch?v=_6JCfp8v28s>, Jun. 9, 2018, 2 pages.

Extended European Search Report for European Patent Application No. 23834796.7, mailed on Feb. 14, 2025, 12 pages.

Notification to Grant Patent Right for Invention for Chinese Patent Application No. 202210804127.3, mailed on Jan. 7, 2025, 6 pages.

Notice of Reasons for Refusal for Japanese Patent Application No. 2024-550708, mailed on Apr. 22, 2025, 12 pages.

\* cited by examiner

METHOD, APPARATUS, ELECTRONIC DEVICE AND STORAGE MEDIUM FOR PLAYBACK CONTROL

CROSS-REFERENCE TO RELATED APPLICATIONS

This application is a continuation of International Patent Application No. PCT/CN2023/105467, filed on Jul. 3, 2023, which claims priority to Chinese Patent Application No. 202210804127.3, filed Jul. 7, 2022, both of which are incorporated herein by reference in their entireties.

FIELD

The embodiment of the present disclosure relates to the technical field of computer technology, in particular to a method, an apparatus, an electronic device and a storage medium for playback control.

BACKGROUND

In some application software, a user may switch into an audio playback mode to only listen to audio of the video he/she is currently watching without watching video screens.

However, in the related art, operations required for switching into the audio playback mode is cumbersome, which is not conducive to the user to quickly switch into the audio playing mode.

SUMMARY

The embodiment of the present disclosure provides a method and an apparatus for playback control, an electronic device and a storage medium, to simplify the operations required for switching to an audio playing mode.

An embodiment of the present disclosure provides a method for playback control, which includes: playing a first video in a video playback page; and in response to target triggering on the video playback page, stopping displaying a video screen of the first video, and playing audio data of the first video, wherein the target triggering is at least one of sliding and multi-finger touching.

An embodiment of the present disclosure further provides an apparatus for playback control, including: a video playing module configured to play a first video in a video playback page; and an audio playing module configured to stop display a video screen of the first video, and play audio data of the first video, in response to target triggering on the video playback page, wherein the target triggering is at least one of sliding and multi-finger touching.

An embodiment of the present disclosure further provides an electronic device, including: at least one processor; and a memory configured to store at least one program, where when executed by the at least one processor, the at least one computer program causes the at least one processor to implement the method for playback control according to the embodiments of the present disclosure.

An embodiment of the present disclosure further provides a computer-readable storage medium having a computer program stored thereon, the program, when executed by a processor, implements the method for playback control according to the embodiments of the present disclosure.

DETAILED DESCRIPTION

Figure 1:
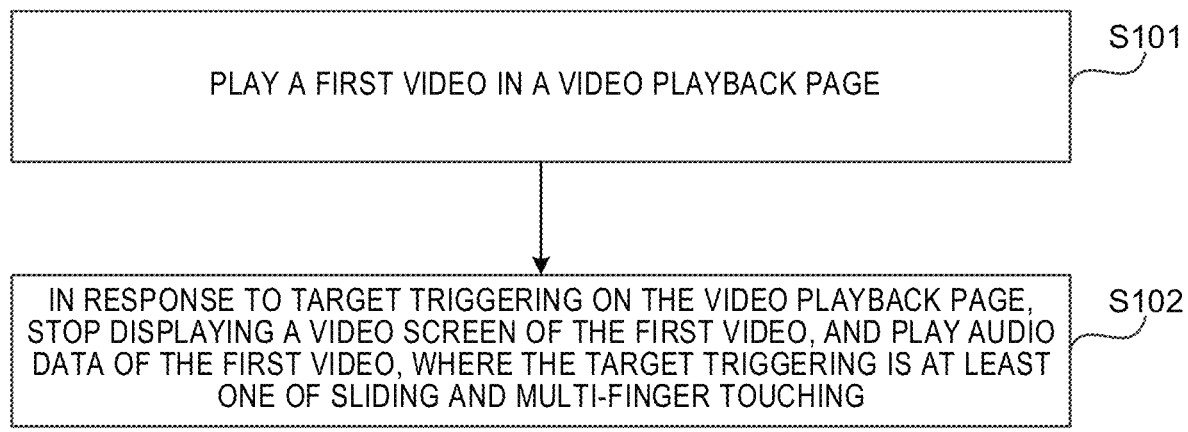
FIG. 1 is a schematic flowchart of a method for playback control according to an embodiment of the present disclosure.

Embodiments of the present disclosure will be described below with reference to the accompanying drawings. While some embodiments of the present disclosure are shown in the drawings, it shall be understood that the present disclosure may be implemented in a variety of forms, and should not be construed as limited to the embodiments set forth herein. On the contrary, these embodiments are provided for a more thorough and complete understanding of the present disclosure.

It shall be understood that the various steps described in the method implementation of this disclosure can be executed in different orders and/or in parallel. In addition, the method implementation can include additional steps and/or the steps as shown may be omitted.

The term "comprising" and its variations as used herein are non-exclusive inclusion, i.e., "including but not limited to". The term "based on" refers to "at least partially based on". The term "one embodiment" refers to "at least one embodiment"; the term "another embodiment" refers to "at least one additional embodiment"; and the term "some embodiments" refers to "at least some embodiments". Relevant definitions of other terms will be given in the following description.

It should be noted that the concepts of "first" and "second" mentioned in this disclosure are only used to distinguish different devices, modules, or units, but are not used to limit the order or interdependence of the functions performed by these devices, modules, or units.

It should be noted that the modifications of "one" and "a plurality of" mentioned in this disclosure are illustrative but not limiting. Those skilled in the art should understand that unless otherwise indicated in the context, they should be understood as "one or more".

The names of messages or information interaction between multiple devices in embodiments of the present disclosure are for illustrative purposes only.

FIG. 1 is a schematic flowchart of a method for playback control according to an embodiment of the present disclosure. The method may be performed by an apparatus for playback control, and the apparatus may be implemented by software and/or hardware, and may be configured in an electronic device, for example, may be configured in a mobile phone or a tablet computer. The method for playback control provided by the embodiment of the present disclosure is suitable for a scene of listening to audio data of a video. As shown in FIG. 1, the method for playback control provided in this embodiment may include the following steps.

At S101, a first video is played in a video playback page.

The first video may be understood as a video currently being played in the video playback page, that is, the currently played video. When the video playback page is a video playback page corresponding to a video, that is, when the video playback page is a video playback page (for example, a detail page of a video) used to play a video only, the first video may be the video played in the video playback page; when the video playback page is a video playback page corresponding to a plurality of videos, that is, when the video playback page has a corresponding video stream, the first video may be a video currently being played in the video playback page in the video stream.

Figure 2:
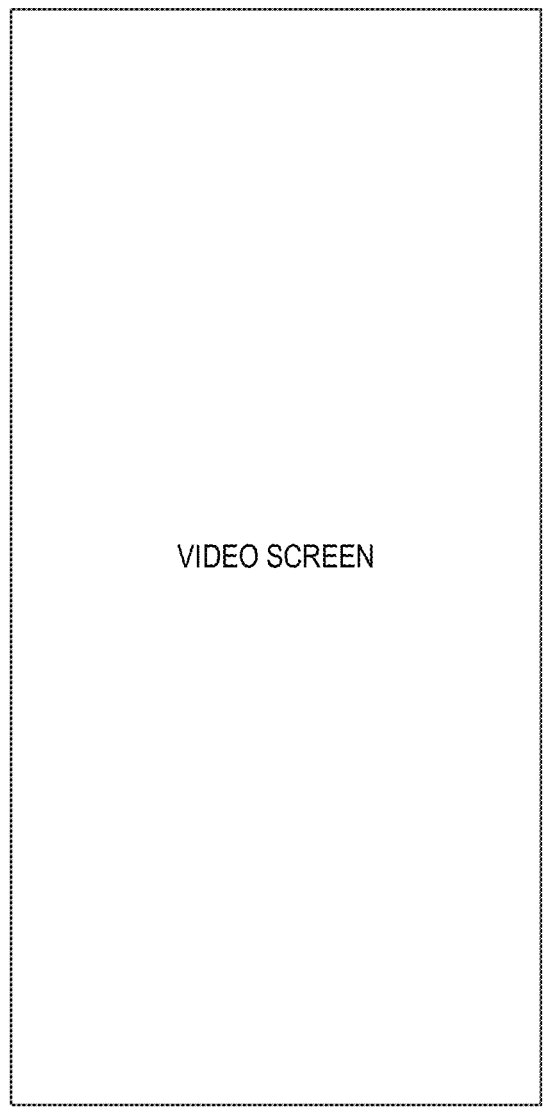
FIG. 2 is a schematic diagram illustrating a display of a video playback page according to an embodiment of the present disclosure.

As shown in FIG. 2, the video may be played in the video playback page, and the video currently being played may be taken as the first video. Here, playing the video may be understood as displaying the video screen of the video while playing the audio data of the video.

S102, in response to target triggering on the video playback page, displaying a video screen of the first video is stopped, and audio data of the first video is played, where the target triggering is at least one of sliding and multi-finger touching.

The target triggering may be understood as triggering to instruct the electronic device to play only audio data of the video. The target triggering may be sliding and/or multi-finger touching, for example, the sliding may include sliding along a preset direction and/or a preset trajectory, and the multi-finger touching may be, for example, multi-finger clicking or a multi-finger sliding. Optionally, the target sliding may be a multi-finger sliding, for example, the target triggering may be multi-finger pinching. The multi-finger pinching may be, for example, two-finger pinching or three-finger pinching, or the like. The target triggering may directly act on the video playback page, for example, directly act on the video playing area where the first video is located or the video screen of the first video displayed in the video playback page, without having to act in the panel or window displayed by the video playback page.

Figure 3:
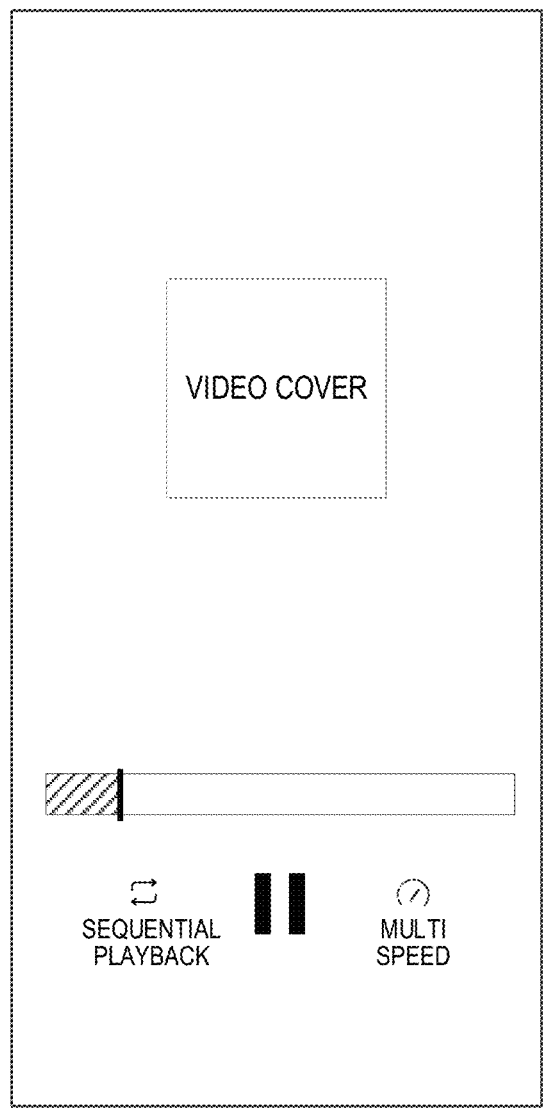
FIG. 3 is a schematic diagram illustrating a display of an audio playback page according to an embodiment of the present disclosure.

When the user wants to only listen to the audio data of the first video and does not watch the video screen of the first video, the target triggering may be performed, for example, multi-finger pinching is performed in the video playback page. Correspondingly, when detecting that the user performs the target triggering, the electronic device may stop displaying the video screen of the first video and play only the audio data of the first video in response to the target triggering, for example, cancelling the display of the video screen of the first video directly in the video playback page, and playing the audio data of the first video, and at this time, the current page is still the video playback page; or switching the current page from the video playback page to an audio playback page, and play the audio data of the first video in the audio playback page, as shown in FIG. 3, in this case, the current page is an audio playback page.

In this embodiment, the user may directly perform the target triggering in the video playback page to control the electronic device to stop displaying the video screen of the first video, that is, the user may perform triggering to switch from the video playback mode to the audio playback mode, and there is no need to switch into the audio playback mode by instructing the electronic device to firstly display a panel/window, then trigger an audio playback mode control within the panel/window after instructing the electronic device through corresponding triggering, thereby simplifying the operation required to switch into the audio playback mode, and reducing the operation cost of the user.

It may be understood that, when the first video is played in the video playback page, the first video may be in a playback state or in a paused state, that is, no matter whether the first video is in a playing state or a paused state, the first video would be considered as being played in the video playback page. Correspondingly, when the audio data of the first video is played, the audio data may also be in a playback state or in a pause state, so that no matter the audio data is in the playback state or in the pause state, the audio data of the first video would be considered as being played. Therefore, when the first video is in the playback state in the video playback page, the audio data may be adjusted to the playing state when the audio data of the first video is played in response to the target triggering; and when the first video is in the paused state in the video playback page, the audio data may be adjusted to the playing state or the paused state when the audio data of the first video is played in response to the target triggering, which may be set as needed.

It should be noted that, when the audio data of the first video is played in response to the target triggering, the audio data is adjusted to a paused state, which is different from pausing the playing of the first video only. When the audio data of the first video is played in response to the target triggering, after the audio data is adjusted to the paused state, the user only needs to click the playback control to continue to listen to the audio data. When the playback of the first video is paused, no matter whether a video screen of the first video is displayed in the video playback page after the first video is paused, after clicking the play control, the electronic device will display the video screen of the first video again and at the same time plays the audio data of the first video.

In addition, after switching into an audio playback mode, the currently being played audio data may be switched based on switching of the user, for example, the currently being played audio data is switched according to the arrangement sequence of the video streams corresponding to the plurality of videos (for example, the plurality of target videos) in the video playback page. When the user is switched back to the video playback mode from the audio playback mode, the video corresponding to the currently being played audio data may be played in the video playback page.

According to the method for playback control provided in this embodiment, the first video is played in the video playback page; in response to the target triggering on the video playback page, display of the video screen of the first video is stopped, and the audio data of the first video is played, where the target triggering is sliding and/or multi-finger touching. By adopting the above technical solution, based on the sliding and/or the multi-finger touching directly on the video playback page, the audio playing mode is switched to, the operations required to switch into the audio playing mode can be simplified, and the operation cost of the user is reduced.

Figure 4:
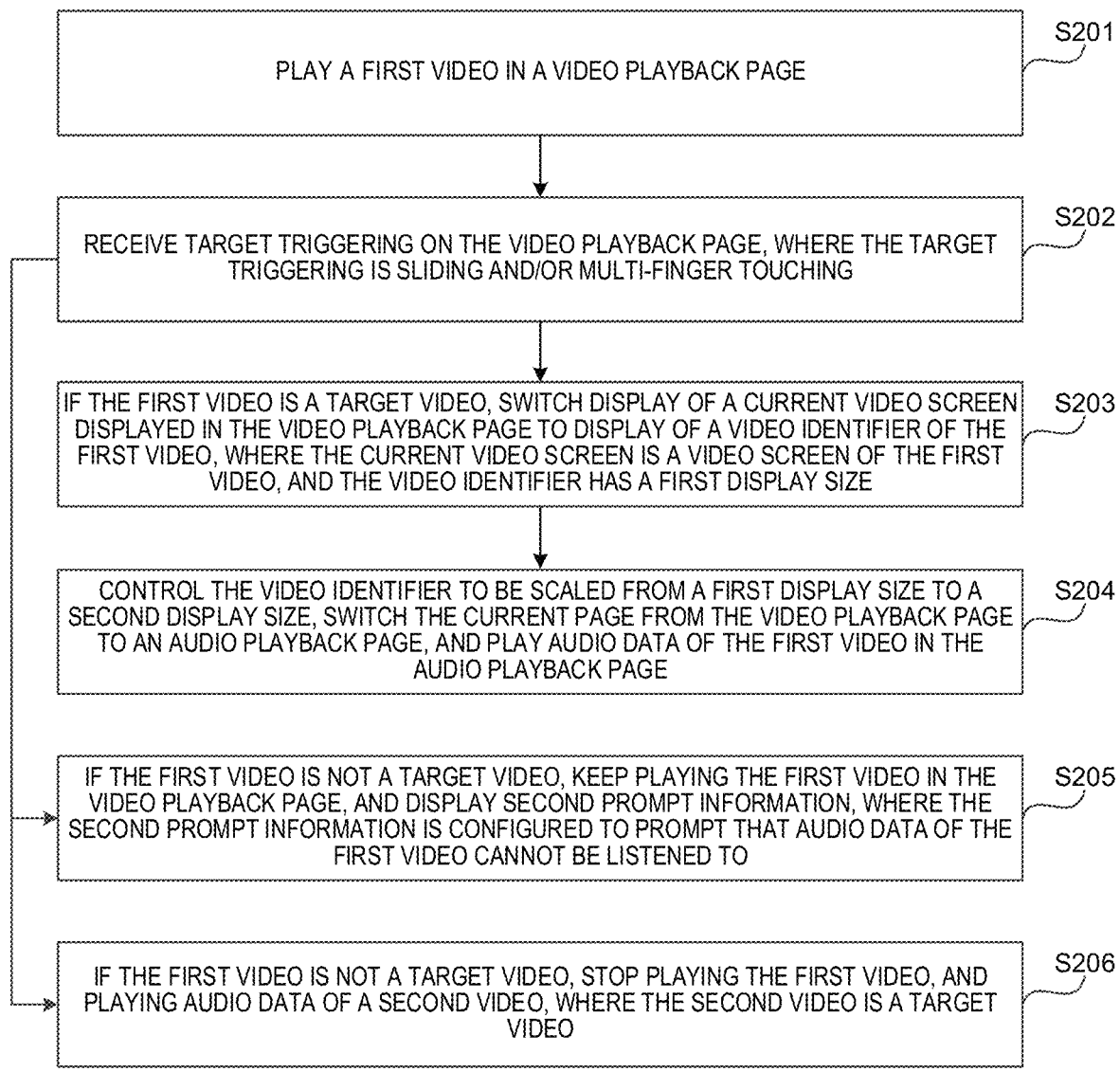
FIG. 4 is a schematic flowchart of another method for playback control according to an embodiment of the present disclosure.

FIG. 4 is a schematic flowchart of another method for playback control according to an embodiment of the present disclosure. The solution in this embodiment may be combined with one or more optional solutions in the foregoing embodiments. Optionally, stopping displaying the video screen of the first video includes: switching display of a current video screen displayed in the video playback page to display of a video identifier of the first video, where the current video screen is a video screen of the first video, and the video identifier has a first display size.

Optionally, the method further includes, after switching the display of the current video screen of the first video displayed in the video playback page to the display of the video identifier of the first video: controlling the video identifier to be scaled from the first display size to a second display size.

Optionally, playing the audio data of the first video includes: switching a current page from the video playback page to an audio playback page, and playing the audio data of the first video in the audio playback page.

Optionally, stopping displaying the video screen of the first video and playing the audio data of the first video includes: if the first video is the target video, stopping displaying the video screen of the first video, and playing the audio data of the first video.

Optionally, the method for playback control provided in this embodiment further includes: if the first video is not a target video, keeping playing the first video in the video playback page, and displaying second prompt information, where the second prompt information is used to prompt that audio data of the first video cannot be listened to; or if the first video is not a target video, stopping playing the first video, and playing audio data of a second video, where the second video is a target video.

As shown in FIG. 4, the method for playback control provided in this embodiment may include the following steps.

At S201, a first video is played in a video playback page.

At S202, target triggering on the video playback page is received, then S203, S205, or S206 is perform, where the target triggering is sliding and/or multi-finger touching.

At S203, if the first video is a target video, display of a current video screen displayed in the video playback page is switched to display of a video identifier of the first video, where the current video screen is a video screen of the first video, and the video identifier has a first display size.

The target video may be understood as a video meeting a preset condition. The preset condition may be set as needed, for example, the preset condition may be set as a specific type of video that has been authorized by the publisher and composed of consecutive video frames (rather than independent pictures). The specific type of video may include, for example, a non-interaction video, a non-advertisement video, and/or a non-live streaming preview video with video duration reaching a preset duration.

The current video screen may be a video screen of the first video displayed in the video playback page when switching to the video identifier of the first video. The video identifier of the first video may include, for example, a video name of the first video, a video cover, and/or a video frame in the first video, and the like. The first display size may be understood as a display size of the video identifier of the first video when the current video screen is initially switched to the video identifier of the first video. Optionally, the first display size is consistent with a display size of the current video screen, a size of a video playback area where the current video screen is located, or a size of the video playback page. That is, display of the current video screen may be switched to a video identifier having a size the same as the display size of the current video screen, the size of the video playback area, or the size of the video playback page. At this time, the video identifier may be displayed according to the position of the current video screen before switching, the position of the video playback area, or the video playback page.

In this embodiment, the video screen of the first video may be stopped to be displayed by switching the current video screen of the first video to the video identifier of the first video.

Taking the video cover as an example of the video identifier and the display size of the current video screen as an example of the first display size, when the target triggering is received, it may be determined whether the first video is the target video, for example, it is determined whether the first video meets a preset condition, if it is determined that the first video is the target video, the display of the current video screen displayed in the video playback page may be stopped, and the video cover of the first video is displayed according to the display size and the display position of the current video screen.

In this embodiment, after receiving the target triggering, for example, when it is determined that the first video is the target video, the current video screen may not be controlled to be scaled, and the display of the current video screen is directly switched to the display of the video identifier of the first video. Alternatively, the current video screen may be firstly controlled to be scaled, for example, the current video screen is gradually scaled to the third display size, and when the display size of the current video screen is scaled to the third display size, the display of the current video screen is switched to the display of the video identifier of the first video. In this case, optionally, the method further includes, before switching the display of the current video screen displayed in the video playback page to the display of the video identifier of the first video: controlling a display size of the current video screen displayed in the video playback page to be scaled to a third display size; switching the current video screen displayed in the video playback page to the video identifier of the first video includes: when the display size of the current video screen is scaled to the third display size, switching the display of the current video screen to the display of the video identifier of the first video.

The third display size may be a preset size or a size corresponding to the target triggering, which may be greater than or less than the initial display size of the video screen of the first video in the video play page before the target triggering is received. Optionally, when the target triggering is multi-finger pinching, the third display size may be smaller than an initial display size of the video screen of the first video, so that the change of the display size of the video screen matches the gesture change of the user. The third display size and the first display size may be the same or different.

For example, after receiving the target triggering, for example, when it is determined that the first video is the target video, the current video screen of the first video may be first controlled to be scaled from the initial display size to the third display size, and when the current video screen of the first video is scaled to the third display size, the display of the current video screen of the first video is switched to the display of the video identifier of the current video. Herein, in the process of controlling the current video screen to be scaled to the third display size, the first video may be played or paused, and correspondingly, the picture content of the current video screen may be changed or kept unchanged in the scaling process.

S204: the video identifier is controlled to be scaled from a first display size to a second display size, the current page is switched from the video playback page to an audio playback page, and audio data of the first video is played in the audio playback page.

The second display size may be different from the first display size, for example, the second display size may be greater than or equal to the first display size. Optionally, when the target triggering is multi-finger pinching, the second display size may be smaller than the first display size, so that change in the display size of the video identifier matches the gesture change of the user. The current page may be understood as a page currently being displayed.

In this embodiment, after the current video screen is switched to the video identifier of the first video, the video identifier of the first video may be scaled from the first display size to the second display size, for example, when the second display size is greater than the first display size, the video identifier of the first video is controlled to be enlarged from the first display size to the second display size, and when the second display size is smaller than the first display size, the video identifier of the first video is controlled to be reduced from the first display size to the second display size. In the process of controlling the video identifier of the first video to be scaled, the current page is switched from the video playback page to the audio playback page, the audio data of the first video is played in the audio playback page, and the video identifier of the first video may be displayed in the audio playback page, as shown in FIG. 3 (an example in which the video identifier is a video cover is illustrated in the drawing).

It may be understood that, in this embodiment, the current page can be switched from the video playback page to the audio playback page before or after the video identifier of the first video is controlled to be scaled, which may be set as needed.

S205: If the first video is not a target video, the playing of the first video is kept in the video playback page, and second prompt information is displayed, where the second prompt information is configured to prompt that audio data of the first video cannot be listened to.

In this embodiment, if the first video played in the video playback page when the target triggering is received is not the target video, the user may not be allowed to switch to the audio playback mode.

For example, when the first video is not the target video, the first video may continue to be played in the video playback page, and the second prompt information is displayed, and the second prompt information is used to prompt the user that the first video does not support separately listening to the audio data.

S206: if the first video is not a target video, the first video is stopped to be played, and audio data of a second video is played, where the second video is a target video.

The second video may be a target video. For example, the second video may be a target video associated with the first video; or may be a target video in a video stream corresponding to the video playback page, for example, a target video that is closest to the first video and located after the first video in the video stream corresponding to the video playback page.

In this embodiment, when the first video played in the video playback page at the time the target triggering is received is not the target video, the user may be allowed to switch to the audio playback mode, at this time, after entering the audio playback mode, the audio data of the first video may not be played, but the audio data of the target video (for example, the second video) is played.

For example, if the first video is not the target video, one target video associated with the first video or one target video in the video stream corresponding to the video playback page may be obtained as the second video, the first video is stopped to be played, that is, the video screen of the first video is stopped to be displayed and the audio data of the first video is stopped to be played, and the audio data of the second video is played (without displaying the video screen of the second video).

In an implementation, the method for playback control provided in this embodiment may further include: in response to a preset prompt condition being met, displaying first prompt information, the first prompt information being configured to prompt to listen to the audio data using the target triggering, where the preset prompting condition comprises at least one of the following: exiting the audio playback page after switching into the audio playback page in response to other triggering than the target triggering, the number of times the first video being played reaching a preset number of times threshold, current time being within a preset time period, and a playing progress of the first video reaching a preset playing progress threshold.

In the foregoing implementation, when the preset prompt condition is met, the first prompt information may be further displayed to prompt the user to switch to the audio playback mode by using the target triggering.

The preset prompting condition may include: exiting the audio playback page after switching to the audio playback page in response to other triggering than the target triggering, the number of times the first video being played reaching a preset number of times threshold, current time being within a preset time period, and a playing progress of the first video reaching a preset playing progress threshold, and/or the number of times of the first prompt information being displayed being less than a set display times threshold, etc. the number of times the first video being played may be the total number of times or the continuous number of times the first video being played, and the preset number of time threshold may be, for example, 3 or 5. For example, the preset time period may be a preset time period corresponding to night, such as 22:00-6:00. The preset play progress threshold may be, for example, 50% or 80%. The set display times threshold may be, for example, 1 or 2.

For example, the preset prompting condition may include: exiting the audio playback page after switching to the audio playback page in response to other triggering than the target triggering, the number of times the first video being played reaching a preset number of times threshold, or current time being within a preset time period and a playing progress of the first video reaching a preset playing progress threshold; and the number of times of the first prompt information being displayed being less than a set display times threshold. In this case, if the number of times of the first prompt information being displayed has not reached the set display times threshold, the first prompt information may be displayed when exiting the audio playback page after the user switches to the audio playback page through another triggering (for example, clicking the audio playback mode control in the panel/window), or the number of times the first video being played reaching a preset number of times threshold, or current time being within a preset time period and a playing progress of the first video reaching a preset playing progress threshold.

In addition, after the first prompt information is displayed, the first prompt information may be automatically stopped to be displayed when the display duration of the first prompt information reaches the preset duration (for example, 3 s); or the first prompt information may be stopped to be displayed upon the target triggering, switching the currently played video, closing the first prompt information (for example, triggering the closing control for the first prompt information).

According to the method for playback control provided by the embodiment, the response mode of the target triggering and the continuity of the picture change when responding to the target triggering can be enriched while the operations required for switching to the audio playing mode are simplified, avoiding a situation in which the picture change is too abrupt, and thus improving the user experience.

Figure 5:
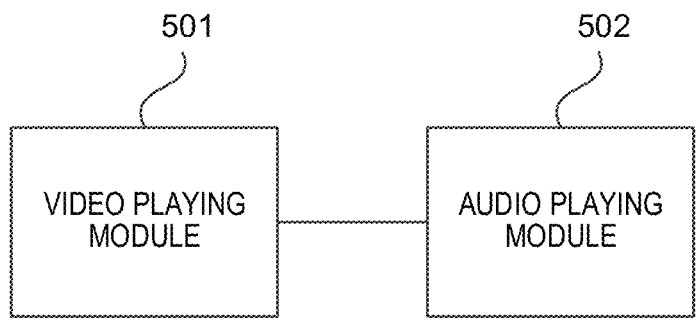
FIG. 5 is a structural block diagram of an apparatus for playback control according to an embodiment of the present disclosure.

FIG. 5 is a structural block diagram of an apparatus for playback control according to an embodiment of the present disclosure. The apparatus may be implemented by software and/or hardware, and may be configured in an electronic device, for example, may be configured in a mobile phone or a tablet computer, and may separately play audio data of the video through a method for playback control. As shown in FIG. 5, the apparatus for playback control provided in this embodiment may include a video playing module 501 and an audio playing module 502.

The video playing module 501 is configured to play a first video in a video playback page.

The audio playing module 502 is configured to stop display a video screen of the first video, and play audio data of the first video, in response to target triggering on the video playback page, where the target triggering is at least one of sliding and multi-finger touching.

In the apparatus for playback control provided in this embodiment, the video playing module plays the first video in the video playback page; and the audio playback module stops displaying a video screen of the first video and plays audio data of the first video, in response to target triggering on the video playback page, where the target triggering is sliding and/or multi-finger touching. By adopting the above technical solution, based on the sliding directly on the video playback page and/or the multi-finger touching, the present embodiment switches to the audio playing mode, the operation required to switch into the audio playing mode can be simplified, and the operation cost of the user is reduced.

In the foregoing solution, the audio playing module 502 may be configured to: switch display of a current video screen displayed in the video playback page to display of a video identifier of the first video, where the current video screen is a video screen of the first video, and the video identifier has a first display size.

In the foregoing solution, the audio playing module 502 may be configured to: after switching the display of the current video screen of the first video displayed in the video playback page to the display of the video identifier of the first video, control the video identifier to be scaled from the first display size to a second display size.

In the foregoing solution, the first display size may be consistent with a display size of the current video screen, a size of a video playback area where the current video screen is located, or a size of the video playback page.

In the above solution, the audio playing module 502 may be configured to: before switching the display of the current video screen displayed in the video playback page to the display of the video identifier of the first video, control a display size of the current video screen displayed in the video playback page to be scaled to a third display size; and in response to the display size of the current video screen being scaled to the third display size, switching the display of the current video screen to the display of the video identifier of the first video.

In the above solution, the audio playing module 502 may be configured to switch a current page from the video playback page to an audio playback page, and playing the audio data of the first video in the audio playback page.

The apparatus for playback control in this embodiment may further include: a prompting module configured to display first prompt information, in response to a preset prompt condition being met, the first prompt information being configured to prompt to listen to the audio data using the target triggering, where the preset prompting condition includes at least one of the following: exiting the audio playback page after switching into the audio playback page in response to other triggering than the target triggering, the number of times the first video being played reaching a preset number of times threshold, current time being within a preset time period, and a playing progress of the first video reaching a preset playing progress threshold.

In the above solution, the audio playing module 502 may be configured to stop displaying the video screen of the first video and play the audio data of the first video if the first video is the target video.

In the above solution, the audio playing module 502 may be further configured to: if the first video is not a target video, keep playing the first video in the video playback page, and displaying second prompt information, where the second prompt information is configured to prompt that audio data of the first video is not able to be listened to; or if the first video is not a target video, stop playing the first video and playing audio data of a second video, where the second video is a target video.

In the above solution, the target triggering may be multi-finger pinching.

The play control device provided by the embodiment of the present disclosure may execute the play control method provided by any embodiment of the present disclosure, and has a function module corresponding to the play control method. For technical details not described in this embodiment, reference may be made to the playback control method provided by any embodiment of the present disclosure.

Figure 6:
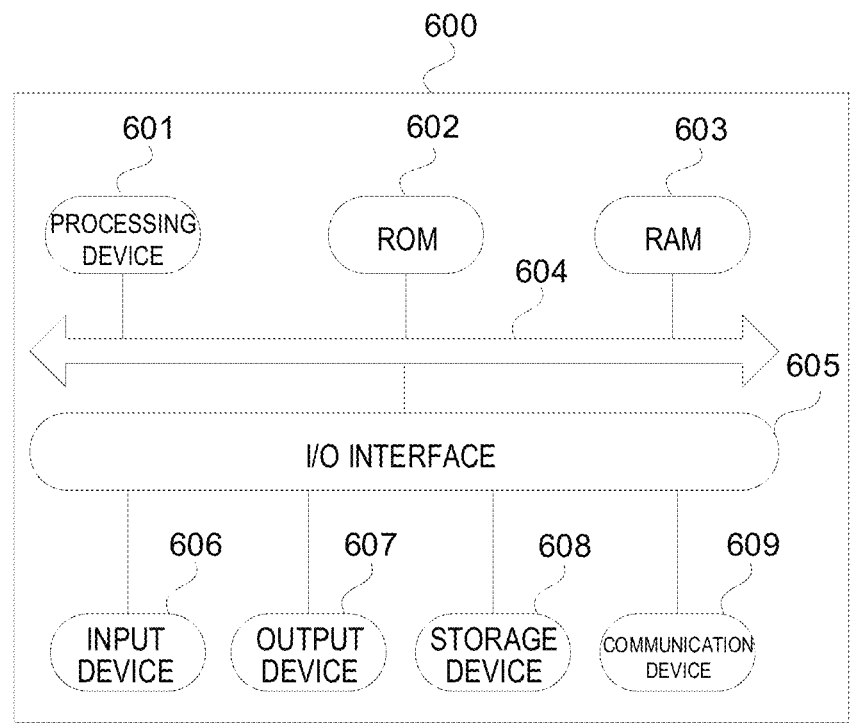
FIG. 6 is a schematic structural diagram of an electronic device according to an embodiment of the present disclosure.

Referring to FIG. 6, it is a schematic structural diagram of an electronic device (for example, a terminal device) 600 suitable for implementing the embodiments of the present disclosure. The terminal device in the embodiments of the present disclosure may include, but is not limited to, a mobile terminal such as a mobile phone, a notebook computer, a digital broadcast receiver, a personal digital assistant (PDA), a tablet computer (PAD), a portable multimedia player (PMP), an in-vehicle terminal (for example, an in-vehicle navigation terminal), and a fixed terminal such as a digital television (TV), a desktop computer, or the like. The electronic device shown in FIG. 6 is merely an example.

As shown in FIG. 6, the electronic device 600 may include a processing device (for example, a central processing unit, a graphics processor, etc.) 601, which may perform various appropriate actions and processing according to a program stored in a read-only memory (ROM) 602 or a program loaded into a random-access memory (RAM) 603 from a storage device 608. In the RAM 603, various programs and data required by operation of the electronic device 600 are also stored. The processing device 601, the ROM 602, and the RAM 603 are connected to each other through a bus 604. An input/output (I/O) interface 605 is also connected to the bus 604.

Typically, the following devices can be connected to I/O interface 605: input devices 606 including, for example, touch screens, touchpads, keyboards, mice, cameras, microphones, accelerometers, gyroscopes, etc.; output devices 607 including liquid crystal displays (LCDs), speakers, vibrators, etc.; storage devices 608 including magnetic tapes, hard disks, etc.; and a communication device 609. The communication device 609 may allow the electronic device 500 to communicate with other devices wirelessly or wirelessly to exchange data. Although FIG. 6 shows an electronic device 600 with a plurality of devices, it shall be understood that it is not required to implement or have all the devices shown. More or fewer devices can be implemented or provided instead.

According to an embodiment of the present disclosure, the process described above with reference to the flowchart can be implemented as a computer software program. For example, an embodiment of the present disclosure includes a computer program product that includes a computer program carried on a non-transitory computer-readable medium, where the computer program includes program code for performing the method shown in the flowchart. In such an embodiment, the computer program can be downloaded and installed from a network through the communication device 609, or installed from the storage device 608, or installed from the ROM 602. When the computer program is executed by the processing device 601, the above functions defined in the method of the embodiment of the present disclosure are performed.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Examples of computer-readable storage media may include but are not limited to: an electrical connection with one or more wires, a portable computer disk, a hard disk, RAM (Random Access Memory), ROM (Read-Only Memory), an Erasable Programmable Read-Only Memory (EPROM) or flash memory, an optical fiber, a portable Compact Disk Read-Only Memory (CD-ROM), an optical storage device, a magnetic storage device, or any suitable combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable medium may be transmitted using any suitable medium, including but not limited to: wires, optical cables, radio frequency (RF), etc., or any suitable combination thereof.

In some embodiments, clients and servers can communicate using any currently known or future developed network protocol such as Hypertext Transfer Protocol (HTTP), and can be interconnected with any form or medium of digital data communication (such as communication networks). Examples of communication networks include Local Area Networks ("LANs"), Wide Area Networks ("WANs"), internetworks (such as the Internet), and end-to-end networks (such as ad hoc end-to-end networks), as well as any currently known or future developed networks.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device: play a first video in a video playback page; and in response to target triggering on the video playback page, stop displaying a video screen of the first video, and play audio data of the first video, where the target triggering is at least one of sliding and multi-finger touching.

Computer program codes for performing the operations of the present disclosure may be written in one or more programming languages or a combination thereof, including but not limited to Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including LAN (Local Area Network) or WAN (Wide Area Network)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware. The name of the module does not constitute a limitation on the unit itself in a certain case.

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, RAM, ROM, EPROM or flash memory, optical fibers, CD-ROM, optical storage devices, magnetic storage devices, or any suitable combination thereof.

According to one or more embodiments of the present disclosure, an example 1 provides a method for playback control, including:
  playing a first video in a video playback page; and
  in response to target triggering on the video playback page, stopping displaying a video screen of the first video, and playing audio data of the first video, where the target triggering is at least one of sliding and multi-finger touching.

According to one or more embodiments of the present disclosure, in an example 2 according to the method of example 1, stopping displaying the video screen of the first video includes:
  switching display of a current video screen displayed in the video playback page to display of a video identifier of the first video, where the current video screen is a video screen of the first video, and the video identifier has a first display size.

According to one or more embodiments of the present disclosure, in an example 3 according to the method of example 2, the method further includes, after switching the display of the current video screen of the first video displayed in the video playback page to the display of the video identifier of the first video:
  controlling the video identifier to be scaled from the first display size to a second display size.

According to one or more embodiments of the present disclosure, in an example 4 according to example 2, the first display size is consistent with a display size of the current video screen, a size of a video playback area where the current video screen is located, or a size of the video playback page.

According to one or more embodiments of the present disclosure, in an example 5 according to example 2, the method further includes, before switching the display of the current video screen displayed in the video playback page to the display of the video identifier of the first video:
  controlling a display size of the current video screen displayed in the video playback page to be scaled to a third display size;
  switching the current video screen displayed in the video playback page to the video identifier of the first video includes:
  in response to the display size of the current video screen being scaled to the third display size, switching the display of the current video screen to the display of the video identifier of the first video.

According to one or more embodiments of the present disclosure, in an example 6 according to the method of example 1, playing the audio data of the first video includes:
  switching a current page from the video playback page to an audio playback page, and playing the audio data of the first video in the audio playback page.

According to one or more embodiments of the present disclosure, in an example 7 according to the method of example 6, the method further includes:
  in response to a preset prompt condition being met, displaying first prompt information, the first prompt information being configured to prompt to listen to the audio data using the target triggering;
  where the preset prompting condition comprises at least one of the following: exiting the audio playback page after switching into the audio playback page in response to other triggering than the target triggering, the number of times the first video being played reaching a preset number of times threshold, current time being within a preset time period, and a playing progress of the first video reaching a preset playing progress threshold.

According to one or more embodiments of the present disclosure, in an example 8 according to the method of any one of examples 1-7, stopping displaying the video screen of the first video and playing the audio data of the first video includes:
  in response to the first video being a target video, stopping displaying the video screen of the first video, and playing the audio data of the first video.

According to one or more embodiments of the present disclosure, in an example 9 according to the method of example 8, the method further includes:
  in response to the first video being not a target video, keeping playing the first video in the video playback page, and displaying second prompt information, where the second prompt information is configured to prompt that audio data of the first video is not able to be listened to; or
  in response to the first video being not a target video, stopping playing the first video and playing audio data of a second video, where the second video is a target video.

According to one or more embodiments of the present disclosure, in an example 10 according to the method of any one of examples 1-7, the target triggering is multi-finger pinching.

According to one or more embodiments of the present disclosure, an example 11 provides an apparatus for playback control, including:
  a video playing module configured to play a first video in a video playback page; and
  an audio playing module configured to stop displaying a video screen of the first video, and play audio data of the first video, in response to target triggering on the video playback page, where the target triggering is at least one of sliding and multi-finger touching.

According to one or more embodiments of the present disclosure, an example 12 provides an electronic device, including:
  one or more processors;
  a memory configured to store one or more programs, and when the one or more programs are executed by the one or more processors, the one or more programs implement the method for playback control according to any one of examples 1-10.

According to one or more embodiments of the present disclosure, an example 13 provides a computer-readable storage medium having stored thereon a computer program, the program, when executed by a processor, implements the method for playback control according to any one of examples 1-10.

The above description is only embodiments of this disclosure and an explanation of the technical principles used. Those skilled in the art should understand that the scope of the disclosure involved in this disclosure is not limited to technical solutions composed of specific combinations of the above technical features, but should also covers other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although a plurality of operations are depicted in a specific order, this should not be understood as requiring these operations to be performed in the specific order shown or in a sequential order. In certain environments, multitasking and parallel processing may be advantageous. Similarly, although a plurality of implementation details are included in the above discussion, these should not be construed as limiting the scope of the present disclosure. Some features described in the context of individual embodiments can also be implemented in combination in a single embodiment. Conversely, a plurality of features described in the context of a single embodiment can also be implemented in a plurality of embodiments separately or in any suitable sub-combination.

We claim:

1. A method for playback control, comprising:
    playing a first video in a video playback page; and
    in response to target triggering on the video playback page, stopping displaying a video screen of the first video, and playing audio data of the first video, wherein the target triggering is at least one of sliding or multi-finger touching,
    wherein stopping displaying the video screen of the first video and playing the audio data of the first video comprises:
    in response to the first video being a target video, stopping displaying the video screen of the first video, and playing the audio data of the first video; and
    in response to the first video being not a target video, keeping playing the first video in the video playback page, and displaying second prompt information, wherein the second prompt information is configured to prompt that audio data of the first video is not able to be listened to; or
    in response to the first video being not a target video, stopping playing the first video and playing audio data of a second video, wherein the second video is a target video.

2. The method of claim 1, wherein stopping displaying the video screen of the first video comprises:
    switching display of a current video screen displayed in the video playback page to display of a video identifier of the first video, wherein the current video screen is a video screen of the first video, and the video identifier has a first display size.

3. The method of claim 2, further comprising, after switching the display of the current video screen of the first video displayed in the video playback page to the display of the video identifier of the first video:
    controlling the video identifier to be scaled from the first display size to a second display size.

4. The method of claim 2, wherein the first display size is consistent with a display size of the current video screen, a size of a video playback area where the current video screen is located, or a size of the video playback page.

5. The method of claim 2, further comprising, before switching the display of the current video screen displayed in the video playback page to the display of the video identifier of the first video:
    controlling a display size of the current video screen displayed in the video playback page to be scaled to a third display size;
    switching the current video screen displayed in the video playback page to the video identifier of the first video comprising:
    in response to the display size of the current video screen being scaled to the third display size, switching the display of the current video screen to the display of the video identifier of the first video.

6. The method of claim 1, wherein playing the audio data of the first video comprises:
    switching a current page from the video playback page to an audio playback page, and playing the audio data of the first video in the audio playback page.

7. The method of claim 6, further comprising:
    in response to a preset prompt condition being met, displaying first prompt information, the first prompt information being configured to prompt to listen to the audio data using the target triggering;
    wherein the preset prompting condition comprises at least one of the following: exiting the audio playback page after switching into the audio playback page in response to other triggering than the target triggering, a number of times the first video being played reaching a preset number of times threshold, current time being within a preset time period, and a playing progress of the first video reaching a preset playing progress threshold.

8. The method of claim 1, wherein the target triggering is multi-finger pinching.

9. An electronic device, comprising:
    at least one processor; and
    a memory communicatively connected to the at least one processor, wherein,
    the memory stores a computer program executable by the at least one processor, and the computer program is executed by the at least one processor to cause the at least one processor to implement acts comprising:
    playing a first video in a video playback page; and
    in response to target triggering on the video playback page, stopping displaying a video screen of the first video, and playing audio data of the first video, wherein the target triggering is at least one of sliding or multi-finger touching,
    wherein stopping displaying the video screen of the first video and playing the audio data of the first video comprises:
    in response to the first video being a target video, stopping displaying the video screen of the first video, and playing the audio data of the first video; and
    in response to the first video being not a target video, keeping playing the first video in the video playback page, and displaying second prompt information, wherein the second prompt information is configured to prompt that audio data of the first video is not able to be listened to; or
    in response to the first video being not a target video, stopping playing the first video and playing audio data of a second video, wherein the second video is a target video.

10. The electronic device of claim 9, wherein stopping displaying the video screen of the first video comprises:
    switching display of a current video screen displayed in the video playback page to display of a video identifier of the first video, wherein the current video screen is a video screen of the first video, and the video identifier has a first display size.

11. The electronic device of claim 10, wherein the acts further comprises, after switching the display of the current video screen of the first video displayed in the video playback page to the display of the video identifier of the first video:

controlling the video identifier to be scaled from the first display size to a second display size.

12. The electronic device of claim 10, wherein the first display size is consistent with a display size of the current video screen, a size of a video playback area where the current video screen is located, or a size of the video playback page.

13. The electronic device of claim 10, wherein the acts further comprises, before switching the display of the current video screen displayed in the video playback page to the display of the video identifier of the first video:

controlling a display size of the current video screen displayed in the video playback page to be scaled to a third display size;

switching the current video screen displayed in the video playback page to the video identifier of the first video comprising:

in response to the display size of the current video screen being scaled to the third display size, switching the display of the current video screen to the display of the video identifier of the first video.

14. The electronic device of claim 9, wherein playing the audio data of the first video comprises:

switching a current page from the video playback page to an audio playback page, and playing the audio data of the first video in the audio playback page.

15. The electronic device of claim 14, wherein the acts further comprises:

in response to a preset prompt condition being met, displaying first prompt information, the first prompt information being configured to prompt to listen to the audio data using the target triggering;

wherein the preset prompting condition comprises at least one of the following: exiting the audio playback page after switching into the audio playback page in response to other triggering than the target triggering, a number of times the first video being played reaching a preset number of times threshold, current time being within a preset time period, and a playing progress of the first video reaching a preset playing progress threshold.

16. A non-transitory computer-readable storage medium storing computer instructions, the computer instruction are configured to cause a processor to implement acts comprising:

playing a first video in a video playback page; and in response to target triggering on the video playback page, stopping displaying a video screen of the first video, and playing audio data of the first video, wherein the target triggering is at least one of sliding or multi-finger touching, wherein stopping displaying the video screen of the first video and playing the audio data of the first video comprises:

in response to the first video being a target video, stopping displaying the video screen of the first video, and playing the audio data of the first video; and in response to the first video being not a target video, keeping playing the first video in the video playback page, and displaying second prompt information, wherein the second prompt information is configured to prompt that audio data of the first video is not able to be listened to; or in response to the first video being not a target video, stopping playing the first video and playing audio data of a second video, wherein the second video is a target video.

* * * * *